March 31, 1936.  H. M. HAMMOND  2,035,472

FLUID FLOW METER

Filed Nov. 7, 1930

INVENTOR
Harold M. Hammond,
BY
ATTORNEY

Patented Mar. 31, 1936

2,035,472

UNITED STATES PATENT OFFICE 2,035,472

FLUID FLOW-METER

Harold M. Hammond, East Cleveland, Ohio, assignor to Bailey Meter Company, a corporation of Delaware Application November 7, 1930, Serial No. 494,074

9 Claims. (Cl. 73—167)

This invention relates to improvements in a flow meter having an adjustable orifice for creating a pressure difference which bears a definite relation to the rate of flow of a fluid. It has a particular reference to providing means for automatically varying an orifice area when predetermined conditions exist.

A rate of flow meter for fluids is usually so designed as to indicate a maximum at a definite value of differential pressure applied; said differential pressure produced by the flow of a certain volume of fluid at definite density conditions past an orifice in a unit of time. A quadratic relation exists between differential pressure and rate of flow, so that at low rates of flow, relatively low power in the form of differential pressure is available to actuate the flow meter, and inaccuracies of metering may result. Should the rate of flow for a relatively large portion of the time be a small percentage of the maximum, then it is desirable to change the rate of flow-pressure differential relation for such time by causing the given rate of flow to produce a greater differential pressure and thus read at a higher point on the flow meter scale. Conversely, should the flow for certain periods of time be greater than that necessary to produce the maximum pressure differential to which the flow meter will respond, it is desirable to cause the given rate of flow to produce a lesser differential pressure and thus bring the reading within the range of the flow meter.

One object of my invention is to provide means for varying an orifice area automatically when predetermined rates of flow or pressure differentials are experienced.

Another object is to provide means wherein the values of rate of flow or pressure differential to which the automatic means are responsive, are adjustable.

A further object is to make adjustable the amount of movement of the means which varies the orifice area.

With these and further objects in view, I will now describe the embodiment of the invention illustrated.

Figure 1:
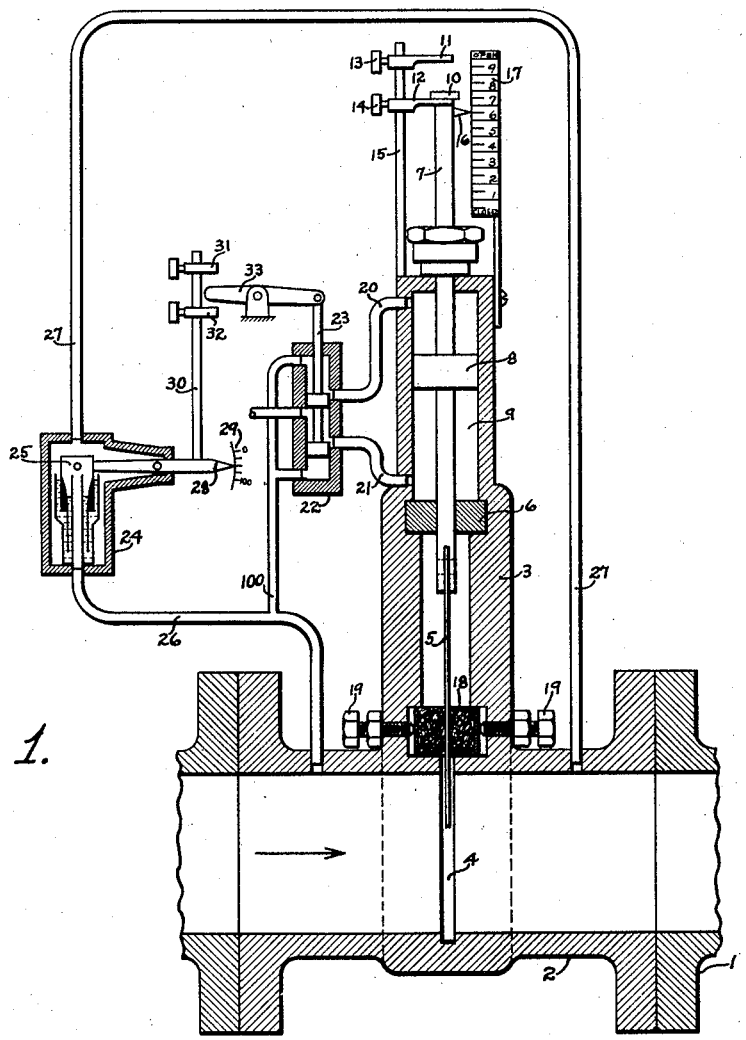
Figure 2:
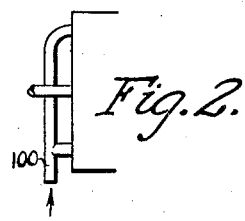

In the drawing, Fig. 1 is an elevation, partly in section and partly diagrammatic, of a system for automatically varying an orifice area, and Fig. 2 illustrates a modification of Fig. 1.

I have indicated at 2 a casing or pipe section positioned in flow conducting relation between portions of a conduit 1 which is adapted for the passage of fluid; there being a through passage for flow in the pipe section 2 of like area and contour to the interior of the conduit 1. A housing 3 is formed as an extension of the casing 2, preferably at right angles to the axis of the conduit 1. In the casing 2 and extending into the housing 3 transversely of the flow of fluid through the conduit 1, I have shown a slideway 4 in which may be moved or positioned a slide plate 5, in the preferred form being a thin metal plate and forming when positioned across any portion of the area of the through passage of the casing 2 an obstruction to the flow of fluid therethrough. The remaining area for flow-passage in the plane of movement of the projecting plate being understood as a segmental orifice whose area will increase or decrease as the slide plate is projected a lesser or greater amount into the flowing stream.

A stem 7 is fastened at its lower end to the slide plate 5, and serves to position the slide plate in the slideway. The stem 7 passes through a bushing 6, and has a cylindrical enlargement or piston 8 cooperating in a cylindrical portion 9 of the housing 3. A head 10 on the stem 7 is adapted to engage the limiting stops 11 and 12 which are respectively held through the medium of the clamping screws 13 and 14 on a projection 15 of the housing 3, in a manner such that movement of the stem 7 and correspondingly, movement of the slide plate 5 will be limited when the head 10 comes against one or the other of the limiting stops referred to. I have shown as fastened to and moving with the stem 7 a pointer 16 cooperating with an index 17 supported from the housing 3, the cooperation of the pointer with the index giving an indication of the position of the slide plate 5 across the passageway of the casing 2. The index 17 may be desirably graduated in terms of multipliers for an index 29 later to be described, through the agency of which the index 29 is used regardless of the position of the slide plate 5, it only being necessary to multiply the readings on the index 29 by the simultaneous reading on the index 17 to obtain the rate of fluid flow past the slide plate. For sealing passage around the slide plate 5 I have provided clamping members 18 held by the screws 19, the clamping members being of rubber, felt or other material of a nature such that when forced against the slide plate 5 they will seal off pressure, but will not offer great resistance to the axial movement of the slide plate.

The slide plate 5 is positioned, in the present embodiment of my invention, to one or the other of two predetermined amounts of projection within the casing 2 as limited by the head 10 of the stem 7 coming against either the limiting stops 11 or 12. The positioning of the slide plate is accomplished through the application of power to one side or the other of the piston 8, capable of movement in the cylinder 9, and the arrangement is such that when power is applied to one side of the piston, then simultaneously fluid is bled, or its pressure released from the other side of the piston, to the end that the piston and correspondingly the slide plate will move to one extreme of its travel and be held in that position through the maintenance of pressure on the side of the piston which initially caused the movement.

Leading to the cylinder 9 at the upper side of the piston 8 is a pipe 20, while leading to the other side of the piston in the cylinder 9 is a pipe 21. The pipes 20 and 21 joining the cylinder with a pilot valve assembly, generally indicated at 22, of well known type, to which fluid under pressure is supplied through a pipe 100.

In the pilot assembly 22 a pilot 23 may be positioned to allow passage of fluid to or from the cylinder 9 on opposite sides of the piston 8. For example, if fluid pressure is allowed to pass to the cylinder 9 at one side of the piston 8, then simultaneously pressure will be released from the other side of the piston.

To position the pilot 23 in the pilot assembly 22 I have indicated means responsive generally to predetermined rates of flow or pressure differentials in the casing 2. A differential pressure gage generally indicated at 24 is of a type wherein a liquid sealed inverted bell 25 moves in response to variations in differential pressure transmitted to the underside of the bell through the pipe connection 26 and to the outside of the bell through the pipe connection 27. The pipe connections 26 and 27 entering the casing 2 at opposite sides of the orifice. A vertical motion of the bell 25 of equal increments results from equal increments of rate of flow due to the fact that the bell is of a type wherein a variable buoyant effect counteracts the differential pressure to produce stability and to correct for the quadratic relation existing between differential pressure and rate of flow.

Positioned by the bell 25 is a pointer 28 cooperating with an index 29. The pointer arm carries a projection 30 on which are the adjustable arms 31 and 32 adapted to engage at predetermined positions of travel one end of a fulcrumed lever 33, to the other end of which is suspended the pilot 23.

Fluid under control of the pilot valve 22 for action upon the piston 8 is obtained by a branch of the pipe 26 from the stream of flowing fluid through the casing 2.

In operation, assuming a fluid flow in the direction of the arrow through the casing 2 and that the slide plate 5 is so positioned in the slideway 4 that a portion of the passage-area through the casing 2 is obstructed by the projection of a portion of the slide plate 5, then the pressure differential so produced is effective through the pipes 26 and 27 upon the differential pressure gage 24, causing the bell 25 to assume a definite position. This position is indicated on the index 29, and definite corresponding positions of the arms 31 and 32 will result.

A certain amount of variation in rate of flow may be had without the arm 31 or the arm 32 engaging the lever 33. If, however, for example, the rate of flow increases to a predetermined point, for example 75% of the maximum to which the flow meter is calibrated, then the arm 31 will engage the coacting end of the lever 33 and move that end downward if the flow continues to increase, until after a certain amount of motion the pilot 23 is moved upwardly until pressure from the pipe 26 is allowed to pass through the pilot valve 22 to the underside of the piston 8, causing said piston to move upwardly until the head 10 engages the limit 11. While fluid pressure has been effective upon the underside of the piston 8, causing it to move upward, the fluid above the piston 8 in the cylinder 9 has been allowed to drain through the pilot valve 22. Upward movement of the piston 8 has resulted in a positioning of the slide plate 5 to a new area of obstruction within the passageway of the chamber 2 to the flowing fluid, and a new differential pressure will be effective through the pipes 26 and 27 on the differential pressure gage 24 for the same rate of flow as previously.

Conversely, if the rate of flow should decrease to a low point on the meter reading, then engagement of the arm 32 with the free end of the lever 33 would reposition the pilot in a direction to cause the piston 8 and correspondingly the slide plate 5 to assume the original position. If the predetermined point for the reversal of position of the pilot 23 were, for example, 40% of maximum rate of flow, then when such reversal has occurred and the slide plate 5 has reached its new position, the same rate of flow in pounds or cubic feet or other desirable units might read, for example, 95% on the index 29, due to the fact that the definite maximum pressure differential to which the differential pressure gage 24 is responsive is now accomplished through a lesser rate of flow than previously.

It will be seen that I have through my invention the advantage of automatically varying the capacity of an orifice to the end that a certain flow meter designed and constructed to give a maximum index reading for a definite pressure differential may be used for two predetermined capacity maximums without the necessity of by hand changing the orifice plate or making any change in the meter, or in fact going near the installation at all. If in the flow of a certain fluid we assume that the maximum rate of flow through the daytime is twice that experienced as a maximum at night, then the limiting stops 11 and 12 may be so adjusted that the two possible positions of the slide plate 5, namely with the head 10 against the stop 11 or against the stop 12, will result in a certain pressure differential for a given rate of flow for one of the positions, and the same pressure differential for twice the rate of flow when the slide plate is in the other position. The change of capacity as effected through change in orifice area is accomplished automatically when the rate of flow or pressure differential reaches a predetermined low or high point for the then existing position of the slide plate 5 as determined by the adjusted position of the arms 31 or 32.

It will be evident that by adjusting the position of the arms 31 and 32 upon the rod 30, a change in the capacity or amount of obstruction to the flowing fluid may be made to occur at the desired percent of maximum flow meter index reading, while a change in the position of the limit stops 11 and 12 may be made to basically change the total capacity or differential condition, taking into account the fluid being metered as well as its density or specific volume values.

Through the use of my invention I obtain the distinct advantage of being able to change the maximum rate of flow which a given flow meter will react to at a maximum without the necessity of shutting off the flow of fluid or operating numerous valves or changing orifices. I have the further advantage that this change of capacity or effective differential pressure may be made automatically when the rate of flow would be o such a small percentage of the maximum tha the meter would be operating in its most inac curate portion. The same would be true whe the rate of flow reached a maximum value tending to over deflect the flow meter.

It will be evident that other types of construction than those shown may be used with equal advantage. For while I prefer to use the fluid flowing through the casing 2 as a means of operating the piston 8, this is not necessary, as the pilot 22 might control the flow of another and separate fluid for so moving the piston 8. In Fig. 2 I have shown such a construction wherein the pipe 100 transmitting fluid pressure to the pilot is not connected to the pipe 26, but may make available at the pilot any desired pressure transmitting fluid from any convenient source. Likewise the differntial pressure gage 24 might be of a construction different from that shown without losing the advantages claimed.

Having now described and illustrated a preferred embodiment of my invention, I desire it to be understood that I have not limited myself other than as claimed in view of prior art.

What I claim as new and desire to secure by Letters Patent of the United States, is:—

1. In combination, a conduit for the passage of fluid, a differential pressure gage, movable means positioned in said conduit for creating a pressure difference to which said differential pressure gage is responsive, said pressure difference bearing a definite relation to the rate of flow of fluid in the conduit, and means controlled by said differential pressure gage at known predetermined pressure differences corresponding to definite rates of flow for positioning said first named means for varying said pressure differences to different known predetermined pressure differences created by said definite rates of flow.

2. In combination, a conduit for the passage of fluid, a differential pressure gage, adjustable means in said conduit for creating a pressure difference to which said differential pressure gage is responsive, said pressure difference bearing a definite relation to the rate of flow of fluid in the conduit, and means controlled by said differential pressure gage at known predetermined pressure differences corresponding to definite rates of flow for positioning said first named means for varying said pressure differences to different known predetermined pressure differences created by said definite rates of flow.

3. The combination with a conduit through which a fluid flows, of a plate which slidably projects into the conduit transversely thereof and defines with the passageway of said conduit in the plane of projection of said plate into the conduit a segmental orifice for creating a pressure difference which bears a definite relation to the rate of flow of the fluid, means for positioning said plate for varying the area of said orifice, said means comprising a piston cooperating in a cylinder, adjustable means limiting the travel of said piston, a pilot valve for controlling the passage of fluid to said cylinder on opposite sides of said piston, and adjustable means for positioning said pilot valve, said last named means responsive to predetermined pressure differences created by said orifice.

4. In combination with a conduit through which a fluid flows, of a plate which slidably projects into the conduit transversely thereof and defines with the walls of said conduit a segmental orifice for creating a pressure difference across said orifice which bears a definite relation to the rate of flow of the fluid through the orifice, a device positioned by and in amount proportional to said pressure difference, and fluid operated means for positioning said plate for varying the area of said orifice, said fluid operated means controlled by said device.

5. In combination with a conduit through which fluid flows, of a plate which slidably projects into the conduit transversely thereof and defines with the walls of said conduit a segmental orifice for creating a pressure difference across the orifice which bears a definite relation to the rate of flow of the fluid therethrough, metering means responsive to such pressure difference, fluid operated means for positioning said plate, and controlling means for said fluid operated means and controlled by said metering means when said metering means is in a predetermined position.

6. In combination with a conduit through which a fluid flows, slidable means capable of being positioned across the conduit for creating a pressure difference across the orifice so formed which bears a definite relation to the rate of flow of fluid therethrough, a differential pressure gage responsive to such pressure differential, pipes connecting the gage to the conduit at opposite sides of the orifice, and means controlled by said gage at predetermined pressure differences across said slidable means for positioning said slidable means to produce another predetermined pressure difference for that rate of fluid flow.

7. In combination with a conduit through which a fluid flows, a movable plate which projects into the conduit transversely thereof and defines with the walls of said conduit a segmental orifice, means sensitive to a predetermined range in the values of differential pressures across the orifice, and means controlled by said last named means for positioning said movable plate in accordance with definite known predetermined pressure differences created by said definite rates of flow for varying the area of said orifice.

8. In combination, a conduit for the passage of fluid, a differential pressure gage, movable means positioned in said conduit for creating a pressure difference to which said differential pressure gage is responsive, said pressure difference bearing a definite relation to the rate of flow of fluid in the conduit, means for positioning said movable means to a second position at a predetermined rate of flow of fluid and for reverting said movable means to the first position at a second predetermined rate of flow of fluid, said last named means controlled by said differential pressure gage.

9. In combination, a conduit for the passage of fluid, a differential pressure gage, movable means positioned in said conduit for creating a pressure difference to which said differential pressure gage is responsive, said pressure difference bearing a definite relation to the rate of flow of fluid in the conduit, means for positioning said movable means to a second position at a predetermined rate of flow of fluid and for reverting said movable means to the first position at a second predetermined rate of flow less than said first named rate of flow of fluid, said last named means controlled by said differential pressure gage.

HAROLD M. HAMMOND.